(12) United States Patent
Marchetti et al.

(10) Patent No.: US 11,007,693 B2
(45) Date of Patent: May 18, 2021

(54) PROCESS FOR MOLDING THIN-WALLED SKINS

(71) Applicant: Ford Motor Company, Dearborn, MI (US)

(72) Inventors: Bernard Gerard Marchetti, Rochester Hills, MI (US); Derren Woods, Ann Arbor, MI (US); Bari Brown, Ann Arbor, MI (US); Ryan Mowery, Albion, MI (US)

(73) Assignee: Ford Motor Company, Dearborn, MI (US)

( * ) Notice: Subject to any disclaimer, the term of this patent is extended or adjusted under 35 U.S.C. 154(b) by 403 days.

(21) Appl. No.: 15/899,511

(22) Filed: Feb. 20, 2018

(65) Prior Publication Data

US 2019/0255751 A1    Aug. 22, 2019

(51) Int. Cl.
| | |
|---|---|
| *B29C 45/34* | (2006.01) |
| *B29C 45/17* | (2006.01) |
| *B29C 45/18* | (2006.01) |
| *B29C 45/00* | (2006.01) |
| *B29C 45/63* | (2006.01) |
| *B29C 45/40* | (2006.01) |

(52) U.S. Cl.
CPC .......... *B29C 45/34* (2013.01); *B29C 45/0053* (2013.01); *B29C 45/174* (2013.01); *B29C 45/1816* (2013.01); *B29C 45/63* (2013.01); *B29C 45/0025* (2013.01); *B29C 45/401* (2013.01); *B29C 2045/0079* (2013.01)

(58) Field of Classification Search
CPC ..................................................... B29C 45/34
See application file for complete search history.

(56) References Cited

U.S. PATENT DOCUMENTS

| | | | |
|---|---|---|---|
| 5,074,770 | A | 12/1991 | Graefe |
| 7,763,195 | B2 | 7/2010 | Yusa et al. |
| 8,168,098 | B2 | 5/2012 | Yusa et al. |
| 2015/0336315 | A1 | 11/2015 | Bedard et al. |

FOREIGN PATENT DOCUMENTS

| | | |
|---|---|---|
| CN | 202399480 | 8/2012 |
| CN | 103568434 | 2/2014 |
| WO | 1999/061223 | 12/1999 |
| WO | 2017/119228 | 7/2017 |

OTHER PUBLICATIONS

Mold-Tech Standex Engraving Group, Tribocoat product page, 2017, available at URL http://www.mold-tech.com/services/tribocoat.php.

(Continued)

*Primary Examiner* — Larry W Thrower
(74) *Attorney, Agent, or Firm* — Burris Law, PLLC

(57) ABSTRACT

A method of forming a thin-walled skin includes coating at least one side of a mold cavity of a molding tool, evacuating air from the mold cavity, and filling the mold cavity with a molten polymeric resin. Among other optional variations of the disclosed method, an inert gas is injected into the molten polymeric resin simultaneously with the step of filling the mold cavity with a molten polymeric resin. As a result, high quality, large, thin-walled skins are produced by the teachings of the present disclosure.

18 Claims, 5 Drawing Sheets

(56) References Cited

OTHER PUBLICATIONS

Bozzelli, J., Eliminate Bubbles, Voids, Sinks & Blisters, posted Jan. 24, 2011, Prospector Knowldege Center at URL https://knowledge.ulprospector.com/1462/eliminate-bubbles-voids-sinks-blisters/.
Smith, Ed, How CO2 Can Improve Gas Assist Injection Molding, posted Jun. 1, 2015, available at URL http://gas.indeus.com/blog/how-co2-can-improve-gas-assist-injection-molding.
Microcellular Injection Molding analysis using a Supercritical Fluid (Concept), Jan. 2, 2017, available at URL https://knowledge.autodesk.com/support/moldflow-insight/learn-explore/caas/CloudHelp/cloudhelp/2017/ENU/MoldflowInsight/files/GUID-05CDE25A-C3DF-4616-8664-0B7743C2A130-htm.html.

PROCESS FOR MOLDING THIN-WALLED SKINS

FIELD

The present disclosure relates to injection molding processes, and more particularly to a process of forming a thin-walled molded part with improved surface quality by injection molding.

BACKGROUND

The statements in this section merely provide background information related to the present disclosure and may not constitute prior art.

Instrument panel skins for dashboard or door panel are conventionally manufactured by thermoforming plastic sheet material or by slush molding plastic material in a powder form, and very few skins are manufactured using the injection molding process. The instrument panel skins are a large part with thin wall sections of approximately 1.0 mm thickness. Accordingly, in the injection molding process, multiple injection ports or gates need to be used in an injection mold. Therefore, as the plastic material from each of these gates flow into the mold cavity, they merge together and create potential visible "knit lines."

It is difficult to fill a large mold with such a thin wall section because the melt front of the molten plastic material freezes off in the molding tool before the entire mold cavity is filled. Therefore, high molding pressure and very fast molding injection time are often desired, potentially exceeding the process and machine capabilities.

Moreover, after the skins are manufactured, post-molding paint may need to be applied on the skins to provide a desired color and gloss, thereby adding significant costs and manufacturing complexity to the molded part.

These issues with surface blemishes and non-uniform gloss on the surface of a thin-walled molded part in injection molding is addressed by the present disclosure.

SUMMARY

In one form, a method of forming a thin-walled skin is provided, which includes coating at least one side of a mold cavity of a molding tool, evacuating air from the mold cavity, and filling the mold cavity with a molten polymeric resin In other features, the method further comprising injecting an inert gas into the molten polymeric resin. A vacuum is held in the mold cavity during the step of filling the mold cavity. A seal is provided between adjacent parts of the molding tool, which includes two halves. The mold cavity is filled with the molten polymeric resin by injection molding. The thin-walled skin has a thickness of about 1.0 mm (0.04 in.) or less. A ratio of a thickness of the thin-walled skin to a length of the thin-walled skin (t/L) is about 0.002 or less. The coating is selected from a group consisting of an electroless nickel coating, a Teflon coating, and a titanium coating. The coating is applied to only a core side of the molding tool. The inert gas is nitrogen gas or carbon dioxide in a supercritical state. An amount of the inert gas is about 0.25% of a mass of the thin-walled skin. The method further comprises venting the mold cavity proximate predetermined end-of-fill locations.

In another form, a method of forming a thin-walled skin is provided, which includes coating at least one side of a mold cavity of a molding tool, evacuating air from the mold cavity and holding the mold cavity at a vacuum condition, and simultaneously injecting the mold cavity with a molten polymeric resin and injecting an inert gas in a supercritical state into the mold cavity while holding the vacuum condition.

In still another form, a process of forming a thin-walled skin is provided, which includes applying a coating on only a core side of a molding tool, evacuating air from a mold cavity of the molding tool and holding the mold cavity at a vacuum condition, and simultaneously filling the mold cavity with a molten polymeric resin and injecting an inert gas in a supercritical state into the molten polymeric resin while holding the vacuum condition.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

Corresponding reference numerals indicate corresponding parts throughout the several views of the drawings.

DETAILED DESCRIPTION

The following description is merely exemplary in nature and is not intended to limit the present disclosure, application, or uses.

Figure 1:
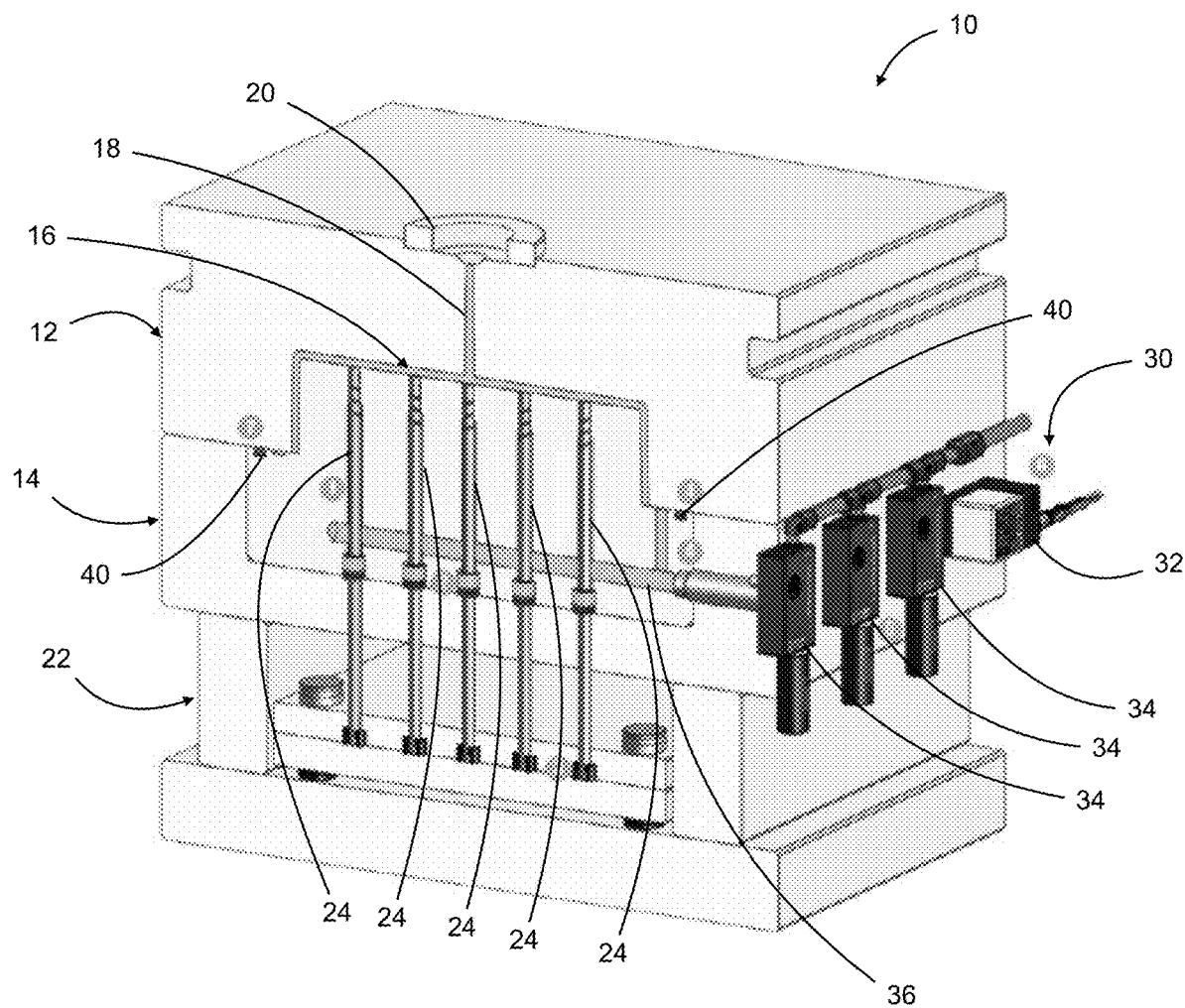
FIG. 1 is a perspective, cross-sectional view of a molding tool with a vacuum system mounted thereon for performing a process of forming a thin-walled skin in accordance with the teachings of the present disclosure.

Referring to FIG. 1, a molding tool 10 used to produce a molded part by injection molding includes a mold having a first mold half 12 attached to an injection molding machine (not shown) and a second mold half 14 that is movable relative to the first mold half 12. In FIG. 1, the first mold half 12 is shown to be the cavity side of the molding tool 10 as it defines a cavity, and the second mold half 14 is shown to be the core side of the molding tool 10 as it includes a core or protrusion extending into the cavity. However, it is understood that the first mold half 12 may be configured to form a core to become a core side of the molding tool 10, whereas the second mold half 14 may be configured to define a cavity to become a cavity side of the molding tool 10 without departing from the scope of the present disclosure. The molded part may be an instrument panel skin or a door panel skin for a motor vehicle. The first mold half 12 and the second mold half 14 jointly define a mold cavity 16 having a shape of a part to be molded. The first mold half 12 defines a sprue orifice 18 and a runner system (not shown)

that includes a plurality of flow channels for connecting the spruce orifice 18 to the mold cavity 16. A sprue bushing 20 is provided at an end of the sprue orifice 18 and connected to a nozzle (not shown) of an injection molding machine. Molten plastics or polymeric resins, such as thermoplastic elastomer (TPE), thermoplastic vulcanizates (TPV) or other thermoplastic materials, from the injection molding machine is injected by the nozzle, through the sprue orifice 18 and the runner system, into various parts of the mold cavity 16. The second mold half 14 is mounted to a movable platen 22. When a molded part is formed in the mold cavity 16, the movable platen 22 may move the second mold half 14 away from the first mold half 12 to expose the molded part. A plurality of ejector pins 24 may be mounted to the platen 22 and extend through the second mold half 14 for ejecting the molded part, if needed.

A vacuum system 30, such as a Cumsa™ vacuum system, is connected to the molding tool 10 for evacuating air from the mold cavity 16 to maintain the mold cavity 16 and the runner system at a vacuum condition. The vacuum system 30 includes a controller 32 and a plurality of vacuum jets 34. The molding tool 10 is configured to define at least one vacuum channel 36 that connects the plurality of vacuum jets 34 to the runner system, preferably at end-of-fill locations.

The molding tool 10 is also configured to define a groove at an interface between the first and second mold halve 12 and 14 for receiving a seal 40. The seal 40 is provided along an entire periphery of the molding tool 10 to completely surround the mold cavity 16 and the runner system to help maintain a vacuum condition in the mold cavity 16 when required.

A coating (not shown) is applied on a mold surface of at least one of the first and second mold halves 12, 14 to facilitate de-molding of the molded part. Preferably, the coating is applied only on the surface of the second mold half 14, which is the core side of the molding tool 10. Therefore, the molded part, once formed, is allowed to stick to the first mold half 12, which is the cavity side of the molding tool 10, for easier de-molding of the molded part.

Conventionally, a molding tool is designed to have the core side of the molding tool connected to the movable platen and the cavity side of the molding tool connected to the nozzle of the injection molding machine. Once the molded part is formed, the core side of the molding tool is moved away from the cavity side of the molding tool and the molded part remains attached to the core side of the molding tool due to the molded part shrinking onto the core of the molding tool. Conventionally, the ejector pins at the core side of the molding tool are used to eject the molded part. However, for a thin-walled skin molded part having a small thickness of 1 mm or less, the ejector pins may cause undesired stretch or distortion marks on the molded part.

In the process of the present disclosure, however, a coating is preferably applied only on the core side of the molding tool 10 to allow the molded part to be easily detached from the core side of the molding tool and sticks to the cavity side of the molding tool 10. A robotic end-of-arm tooling may be used to easily de-mold the molded part from the cavity side of the molding tool 10 to reduce undesired stretch and distortion on the molded part.

It is understood that the coating may be applied to only the cavity side or both the core side and the cavity side of the molding tool in other applications, if needed.

The coating may be a Tribocoat® surface coating, which is an electroless nickel plate coating. This auto-catalytical nickel plating process provides a highly uniform nickel phosphorus alloy coating exhibiting good wear resistance and excellent corrosion resistance. The thickness of the coating across all mold surface is between 0.0002 mm and 0.0020 mm (+/−0.0001 inch), which provides highly reliable uniformity. Alternatively, a combination of nickel and Teflon® polymers as a coating provides an extremely low coefficient of friction with an effortless release from the molding tool 10. The combination of nickel phosphorus alloy coating and Teflon® polymers eliminates the need for release sprays.

Alternatively, the coating may be a Teflon coating, a titanium coating, or any other coating material that can help release the molded part.

Figure 2:
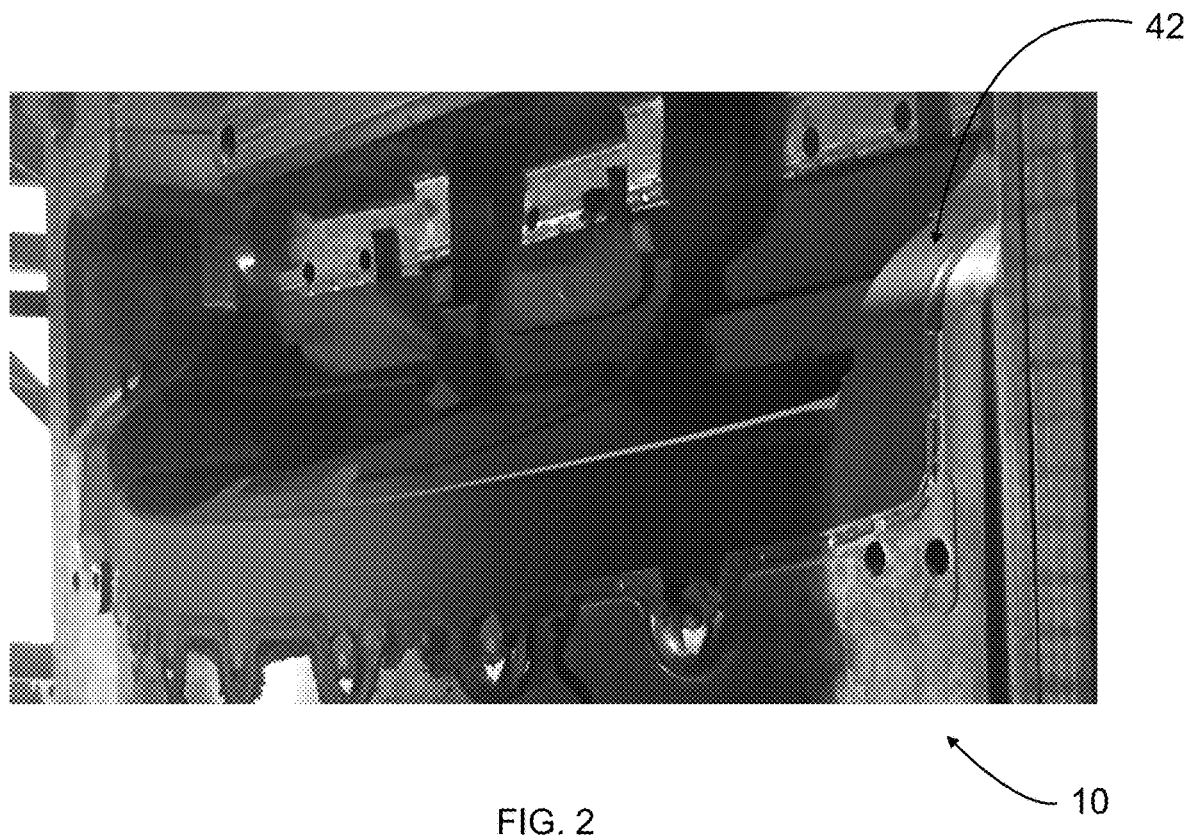
FIG. 2 is a perspective view of a molded part on a mold half formed by a process of forming a thin-walled skin in accordance with the teachings of the present disclosure.
Figure 3:
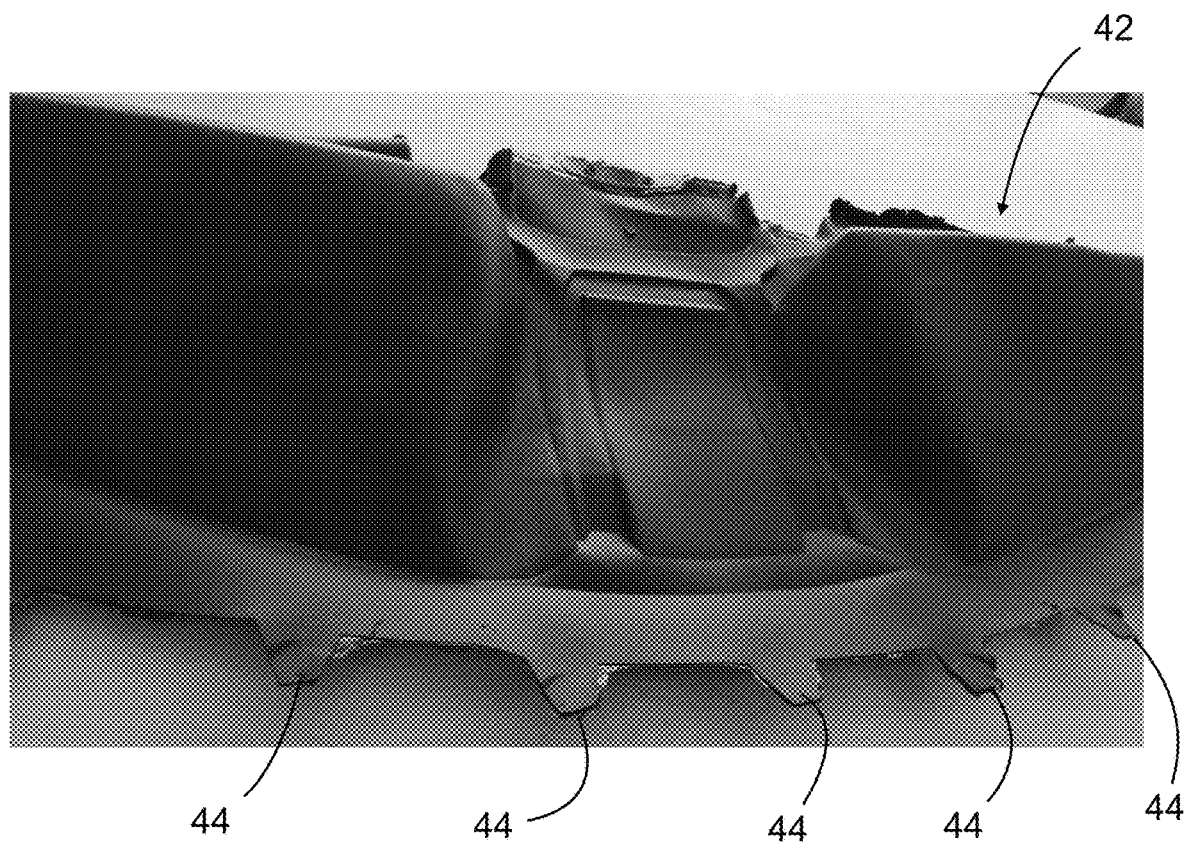
FIG. 3 is a perspective view of a molded part formed by a process of forming a thin-walled skin in accordance with the teachings of the present disclosure.

Referring to FIG. 2, a molded part 42, which is an instrument panel or dashboard skin, is shown to remain on one mold half of the molding tool 10 after the molded part 42 is formed and the mold halves separate. As shown in FIG. 3, the molded part 42 has a large size and a very thin-wall and includes a plurality thin-walled tabs 44. It is relatively difficult to use the ejector pins to eject the molded part 42 without causing stretch marks. Therefore, a robotic end-of-arm tooling may be used to easily de-mold the molded part 42 without causing stretch or distortion marks.

Figure 4:
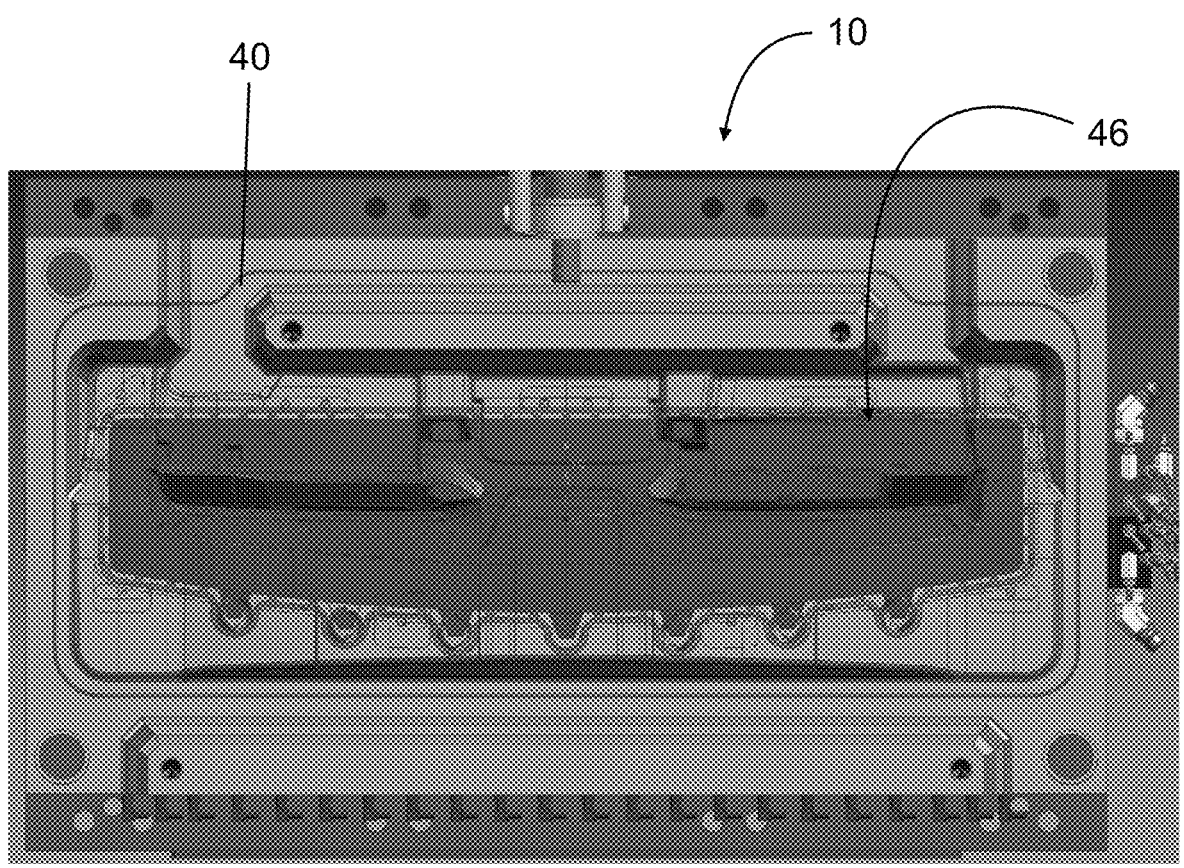
FIG. 4 is a schematic, cross-sectional view of a molding tool in accordance with the teachings of the present disclosure.

Referring to FIG. 4, a mold cavity 46 for forming the dashboard skin 42 is shown. A seal 40 is shown to enclose the mold cavity 46 to ensure vacuum is maintained in the mold cavity 46 during an air evacuation process.

Figure 5:
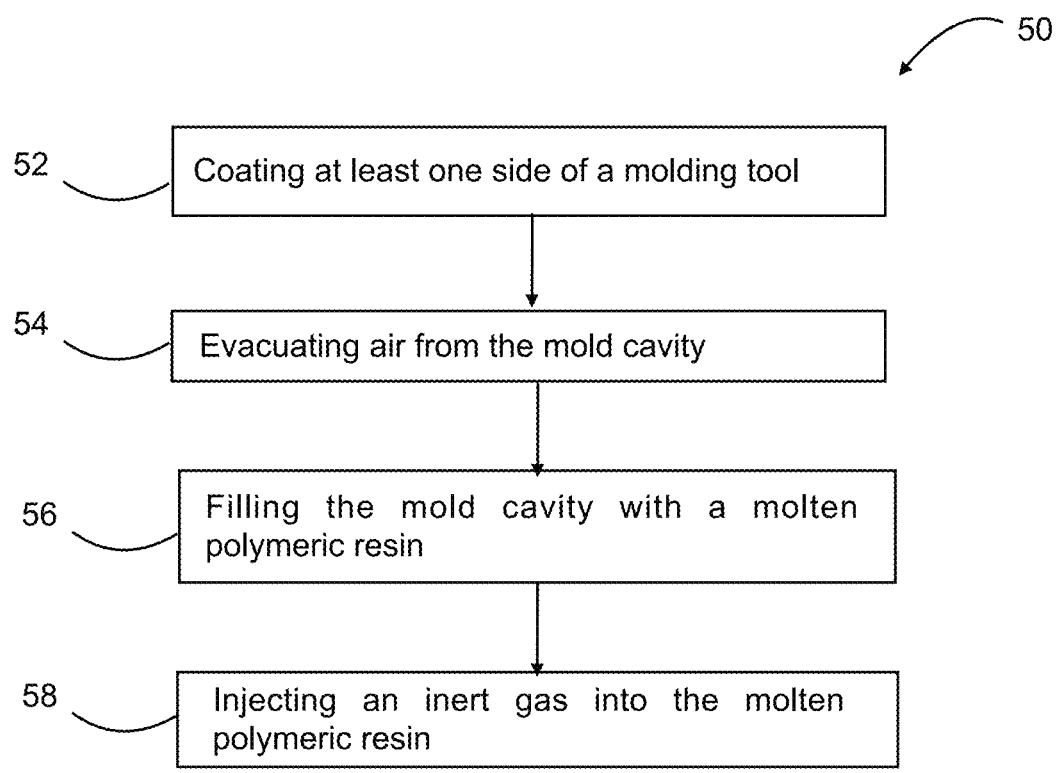
FIG. 5 is a flow chart of a process of forming a thin-walled skin in accordance with the teachings of the present disclosure.

Referring to FIG. 5, a process 50 of forming a thin-walled skin by injection molding starts with coating at least one side of a mold cavity 16 of a molding tool 10 in step 52. The process 50 is suitable for forming a thin-walled skin having a thickness as small as about 1.0 mm (0.04 in.) or less. A ratio of a thickness of the thin-walled skin to a length of the thin-walled skin (t/L) is about 0.002 or less.

The coating helps increase the polymer flow during the injection process and to reduce the de-molding efforts for removing the molded part from the mold. Preferably, the coating is applied only on the core side (i.e., the second mold half 14) of the molding tool 10 to allow the molded part to stick to the cavity side (i.e., the first mold half 12) of the molding tool 10 once the mold halves 12 and 14 are separated. As such, a robotic end-of-arm tooling, instead of ejector pins, may be used to remove the molded part from the mold to eliminate visible stretch/distortion marks on the molded part.

In other applications, the coating may be applied on either one or both of the mold halves. For example, the coating may also be applied on the cavity side of the molding tool to make de-molding of the molded part more predictable.

The coating may be applied on the mold half by first dipping the mold half in a coating solution to apply the coating to only one half of the mold half, followed by flipping the mold half and dipping the other half of the mold half into the coating solution. The mold half is dipped this way due to its large size. The coating may be an electroless nickel material, such as a Tribocoat® HT (High Teflon) coating, or other coatings, such as Teflon and titanium coatings.

After the coating is properly applied on the molding tool and the molding tool is mounted to the injection molding machine, air is evacuated from the mold cavity 16 to create a vacuum condition in the mold cavity 16 in step 54. The mold cavity 16 is vented proximate predetermined end-of-fill locations to evacuate all air from the mold cavity 16. The mold cavity 16 is maintained at a vacuum of approximately 0.7 bar (−10 psi) prior to injection molding.

The seal 40 along the entire periphery of the molding tool 10 helps maintain the mold cavity 16 at the vacuum condition. Vents are placed in the molding tool at and near the polymer "end of fill" locations, which are the last to fill with polymeric resins, so that vacuum is maintained within the mold cavity throughout the entire mold fill time.

The vacuum allows the polymeric resin material to flow over large areas and through multiple gates/channels of the runner system quickly, merge in the mold cavity without creating visible marks or blemishes on the surface of the molded part and not show changes in gloss level, which would otherwise occur due to heat concentration or other process or material factors.

Thereafter, when the mold cavity 16 is maintained at the vacuum condition, the mold cavity 16 is filled with a molten polymeric resin in step 56. The mold cavity 16 is maintained at a vacuum during the injection process.

Optionally, an inert gas in a supercritical state may be simultaneously injected into the molten polymer resin during the injection process in step 58. The inert gas is injected into the molten polymer resin in the injection molding machine by a MuCell® injection molding process. The MuCell® injection molding process involves the highly controlled use of gas in its supercritical state (SCF) to create millions of micron-sized voids in the molten polymer resin. The voids are created or nucleated as a result of homogeneous nucleation that occurs when a single-phase solution of polymer and gas passes through the injection gate into the mold.

The single-phase solution is created through the operation of a conventional injection molding machine which has been modified to allow the creation of a single-phase solution. The key modifications to the system involve the use of a precision SCF delivery system to deliver SCF to special injectors based on mass flow metering principles. The SCF is then injected into the heated barrel where it is mixed with the polymeric resin via a specially designed screw. A shut off nozzle maintains the single phase solution while the injection molding screw maintains sufficient back pressure at all times to prevent premature foaming or the loss of pressure which would cause the single phase solution to return to the two phase solution.

The gas expands and creates microscopic voids in the polymer resin as the polymer resin is injected into the mold cavity 16. The expansion of the gas helps fill the mold cavity 16 fully without the need for traditional "pack and hold" injection machine pressure which is typically used for all conventional molding. A small amount of gas, approximately 0.25% of the final part mass, is injected. Larger amount of gas increases the likelihood of small random balloons being generated in the molded part. The injected gas is an inert gas, such as nitrogen gas or carbon dioxide ($CO_2$).

The MuCell® process advantageously reduces non-uniform surface appearance (primarily gloss) that would otherwise be noticeable if the MuCell® process is not performed. The step of using the gas to pack out the part reduces the stress on the polymeric resin as it solidifies in the mold cavity. It also has the effect of reducing or eliminating gloss level differences in the part, which would otherwise occur if gas is not injected.

The process of the present disclosure combines a vacuum process prior to injection molding to evacuate all air from the mold cavity along with a low dosage of gas through the MuCell® process during injection process to produce a large thin-walled skin with no visible blemishes or non-uniform gloss on the surface of the molded part. The coating applied on the mold surface prior to injection molding allows for easy de-molding of the thin-walled molded part to avoid undesired stretch marks by ejector pins. As such, no post-molding painting is required to improve the appearance of the molded part, thereby reducing the manufacturing costs.

It should be noted that the disclosure is not limited to the embodiment described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A process of forming a thin walled skin having a thickness of about 1.0 mm (0.04 in) or less, the process comprising:
   coating at least one side of a mold cavity of a molding tool;
   evacuating air from the mold cavity; and
   filling the mold cavity with a molten polymeric resin while simultaneously injecting an inert gas into the molten polymeric resin.

2. The process according to claim 1, wherein the inert gas is nitrogen gas or carbon dioxide ($CO_2$) in a supercritical state.

3. The process according to claim 2, wherein an amount of the inert gas is about 0.25% of a mass of the thin-walled skin.

4. The process according to claim 1, wherein a vacuum is held in the mold cavity during the filling the mold cavity.

5. The process according to claim 4, wherein a seal is provided between adjacent parts of the molding tool.

6. The process according to claim 5, wherein the molding tool comprises two halves.

7. The process according to claim 1, wherein the mold cavity is filled with the molten polymeric resin by injection molding.

8. The process according to claim 1, wherein a ratio of the thickness of the skin to a length of the skin (t/L) is about 0.002 or less.

9. The process according to claim 1, wherein the coating is selected from a group consisting of an electroless nickel coating, a Teflon coating, and a titanium coating.

10. The process according to claim 1, wherein the coating is applied to only a core side of the molding tool.

11. The process according to claim 1 further comprising venting the mold cavity proximate predetermined end-of-fill locations.

12. An instrument panel of a motor vehicle having the skin formed by the process according to claim 1.

13. A process of forming a skin having a thickness of about 1.0 mm (0.04 in) or less, the process comprising:
   coating at least one side of a mold cavity of a molding tool;
   evacuating air from the mold cavity and holding the mold cavity at a vacuum condition; and
   simultaneously injecting the mold cavity with a molten polymeric resin and injecting an inert gas in a supercritical state into the mold cavity while holding the vacuum condition.

14. The process according to claim 13, wherein a ratio of a thickness of the skin to a length of the skin (t/L) is about 0.002 or less.

15. The process according to claim 13, wherein an amount of the inert gas is about 0.25% of a mass of the skin.

16. The process according to claim 13 further comprising venting the mold cavity proximate predetermined end-of-fill locations.

17. A process of forming a skin having a thickness of about 1.0 mm (0.04 in) or less, the process comprising:
   applying a coating on only a core side of a molding tool;
   evacuating air from a mold cavity of the molding tool and holding the mold cavity at a vacuum condition; and
   simultaneously filling the mold cavity with a molten polymeric resin and injecting an inert gas in a supercritical state into the molten polymeric resin while holding the vacuum condition.

18. The process according to claim 17, wherein an amount of the inert gas is about 0.25% of a mass of the skin.

\* \* \* \* \*